(12) United States Patent
Dorr et al.

(10) Patent No.: US 7,531,599 B2
(45) Date of Patent: May 12, 2009

(54) DISPERSIONS WITH NANOUREAS

(75) Inventors: Sebastian Dorr, Dusseldorf (DE);
Harald Blum, Leverkusen (DE);
Mathias Matner, Neuss (DE)

(73) Assignee: Bayer Material Science AG (DE)

( * ) Notice: Subject to any disclaimer, the term of this patent is extended or adjusted under 35 U.S.C. 154(b) by 0 days.

(21) Appl. No.: 11/708,930

(22) Filed: Feb. 21, 2007

(65) Prior Publication Data

US 2007/0203288 A1    Aug. 30, 2007

(30) Foreign Application Priority Data

Feb. 24, 2006    (DE) ....................... 10 2006 008 690

(51) Int. Cl.
*C08G 18/08*    (2006.01)
(52) U.S. Cl. ..................................... 524/589
(58) Field of Classification Search ............. 524/589
See application file for complete search history.

(56) References Cited

U.S. PATENT DOCUMENTS 4,171,391 A    10/1979    Parker ......................... 427/246

2005/0137309 A1    6/2005    Musch et al. ............... 524/432

OTHER PUBLICATIONS

Ullmanns Encyclopädie der technischen Chemie, 4th edition, vol. 19, (date unavailable), p. 31-38, Dieter Maassen et al, "Polyalkylenglykole".
Chemical Innovation, 30(2) Feb. 2000, p. 13-18, Ingo Alig et al, "Ultrasonic methods for characterizing polymeric materials".
Database WPI Week 200570 Derwent Publications Ltd., London, GB; AN 2005-683929 XP002437818 & WO 2005/083021 A1 (Nippon Polyurethane Ind Co LTD) Sep. 9, 2005.
Database WPI Week 199937 Derwent Publications Ltd., London, GB; AN 1999-437872 XP002437819 & JP 11 179193 A (Mitsubishi Paper Mills Ltd) Jul. 6, 1999.

*Primary Examiner*—Mark Eashoo
*Assistant Examiner*—Noah Frank
(74) *Attorney, Agent, or Firm*—Connolly Bove Lodge & Hutz LLP

(57) ABSTRACT

The invention relates to aqueous dispersions of nanoureas which have a defined charge density on the particle surface, to a process for preparing them and to their use in binder.

18 Claims, No Drawings

DISPERSIONS WITH NANOUREAS

CROSS-REFERENCE TO RELATED APPLICATIONS

The present application claims the right of priority under 35 U.S.C. §119 (a)-(d) of German Patent Application Number 10 2006 008 690.2, filed Feb. 24, 2006.

BACKGROUND OF THE INVENTION

The invention relates to aqueous dispersions of nanoureas which have a defined charge density on the particle surface, to a process for preparing them and to their use in binder.

The preparation of aqueous dispersions of nanoscale urea particles is described in WO-A 2005/063873. In that case hydrophilic isocyanates are introduced into water in the presence of a catalyst, which initiates crosslinking within the dispersed particles through urea bonds. These particles are used therein as additives for contact adhesives based on polychloroprene.

However, the nanourea dispersions described in WO-A 2005/063873, have certain disadvantages in relation to their production and also in relation to the stability of the dispersions during storage. In the course of the production of the nanoparticles by the process disclosed in WO-A 2005/063873, elimination of carbon dioxide takes place, leading to severe foaming of the reaction mixture, and in turn, to the considerable detriment of the reaction regime. Moreover, the dispersions described are not storage-stable, as there is unwanted evolution of gas during storage.

A further, substantial problem of the dispersions described in WO-A 2005/063873 lies in the inadequate solids content. Solids contents above 30% by weight are virtually impossible to produce with the procedure disclosed in WO-A 2005/063873. The nanourea dispersions described likewise exhibit compatibility problems with anionically hydrophilicized paints or adhesive dispersions, which sharply restricts their use in aqueous applications.

U.S. Pat. No. 4,171,391 describes anionically and cationically hydrophilicized polyurea particles which are prepared by breakdown of diisocyanates to polymer chains in water. These particles, however, do not have any crosslinking, and therefore exhibit elastomeric behavior. Moreover, as a result of ionic hydrophilicization, a high positive or negative surface charge, and hence a correspondingly high zeta potential is generated. As a result, a wide-ranging compatibility with other dispersions is not achieved.

It was an object of the present invention, therefore, to provide storage-stable nanourea dispersions which have a solids content of >30% by weight and are compatible with anionically hydrophilicized binders. A further intention was to provide a new process which solved the above-described problems in the process.

It has now been found that dispersions which comprise nanourea particles and possess a defined zeta potential are compatible with dispersions of anionically hydrophilicized polymers and have a solids content of more than 30% by weight. Moreover, a new process has been found for preparing the dispersions of the invention, in which there is no crosslinking of existing nanourea particles with the further-added polyisocyanates. Nor is there any grafting of the hydrophilicized polyisocyanates onto existing particles, which would lead to large particles and hence to unstable dispersions.

SUMMARY OF THE INVENTION

The present invention accordingly provides nanourea dispersions comprising nanourea particles having a particle size of 10 to 300 nm, preferably of 20 to 250 nm, more preferably of 30 to 200 nm, and a zeta potential (at a pH (23° C.) of 8.0) of 0 to 40 mV, preferably 1 to 35 mV and more preferably of 3 to 30 mV.

DETAILED DESCRIPTION OF THE PREFERRED EMBODIMENTS

The nanourea dispersions of the invention are aqueous dispersions of particles which are crosslinked intraparticulately substantially through urea bonds. The non-crosslinked or pre-crosslinked particles form through dispersion of hydrophilicized polyisocyanates in water. Subsequently, some of the isocyanate groups present are broken down by an isocyanate-water reaction to form the primary amine. These amino groups, by reaction with further isocyanate groups, form urea groups and thereby crosslink to give nanourea particles. Some of the isocyanate groups in this case can also be reacted, before or during the reaction, with water or with other isocyanate-reactive species, such as primary or secondary amines and/or alcohols, for example.

The particles present in the nanourea dispersions of the invention have cationic or basic groups on the particle surface, measured via an acid-base titration, in an amount of 0 to 95 μmol per gram of solids, preferably of 2 to 70 μmol per gram of solids and more preferably of 3 to 20 μmol per gram of solids.

Likewise provided by the present invention is a process for preparing the nanourea dispersions of the invention comprising mixing polyisocyanates possessing nonionic groups for hydrophilicization with water and breaking the polyisocyanates down to urea groups, the ratio of hydrophilicized polyisocyanate to water being chosen so as to result in a total weight ratio of between 1:20 and 1:0.75, preferably between 1:10 and 1:1, more preferably between 1:3 and 1:1.5. The preferred procedure here is the addition of the hydrophilicized polyisocyanate in portions to the water, the total amount of the hydrophilicized polyisocyanate being divided into 2 to 50 equally or differently sized portions, preferably 3 to 20 portions and more preferably 4 to 10 portions, and the addition of each polyisocyanate portion being followed by a pause of between 5 minutes and 12 hours before the next portion is added. Preference is given to a pause of between 10 minutes and 8 hours, more preferably between 30 minutes and 5 hours. An alternative possibility is to meter in at least some of the isocyanate continuously, over the course for example of 1 hour and 24 hours, preferably in the course of 2 hours and 15 hours. During the reaction in the process of the invention, reactor temperatures are maintained of between 10 and 80° C., more preferably between 20 and 70° C. and very preferably between 25 and 50° C.

The dispersing of the hydrophilicized isocyanate and the reaction take place preferably by means of commixing by means of an agitator mechanism, other kinds of commixing, such as by pumping in circulation, for example, by static mixer, barbed mixer, nozzle-jet disperser, rotor and stator, or under the influence of ultrasound.

Subsequent to the reaction, the dispersion of the invention is evacuated, the temperatures for this being between 0° C. and 80° C., preferably between 20° C. and 60° C. and more preferably between 25° C. and 50° C. During the evacuation a pressure is to be set of between 1 and 900 mbar, preferably between 10 and 800 mbar, more preferably between 100 and 400 mbar. A suitable evacuation period is, for example, a time of between 1 minute and 24 hours, preferably between 10 minutes and 8 hours. It is also possible to carry out aftertreatment by raising the temperature without evacuation. In one preferred process the nanourea dispersion is commixed simultaneously with the evacuation—by stirring, for example.

In a further variant of the process of the invention, the hydrophilicized polyisocyanate is mixed with water in a stirring vessel (A) and dispersed in the process. In this process a part of the total amount of the hydrophilicized polyisocyanate is divided into 2 to 50 equally or differently sized portions, preferably 3 to 20 portions and more preferably 4 to 10 portions, and is dispersed with a part of the total amount of the water to be used, this part being divided into 2 to 50 equally or differently sized portions, preferably 3 to 20 portions and more preferably 4 to 10 portions. Here as well the ratio of hydrophilicized polyisocyanate to water is chosen so as to result in a weight ratio of between 1:10 and 5:1, preferably between 1:5 and 3:1, more preferably between 1:3 and 1:1. In the course of the dispersing operation, reactor temperatures are maintained of between 0 and 60° C., preferably between 10 and 50° C. and more preferably between 25 and 40° C.

Following the dispersing operation, the dispersion is transferred to a different reactor (B). The temperature in this reactor (B) is higher than the temperature in the reactor (A) used for dispersing. The temperature in the reactor (B) is between 25 and 80° C., preferably between 30 and 70° C. and more preferably between 35 and 60° C. The reactor (B) is preferably charged with a catalyst, where appropriate, in a mixture with water.

After the dispersion has been transferred from reactor (A) to reactor (B) a pause is to be observed of between 5 minutes and 12 hours before the next portion is added. Preference is given to a pause of between 10 minutes and 8 hours, more preferably between 30 minutes and 5 hours. An alternative option is to transfer at least part of the dispersion continuously from reactor (A) to reactor (B), in the course for example of 1 hour and 24 hours, preferably in the course of 2 hours and 15 hours.

Preference is given to the process in which dispersing and reaction take place in a single vessel.

Examples of suitable catalysts in the reaction are tertiary amines, tin compounds, zinc compounds or bismuth compounds or basic salts. Suitable compounds are, for example, triethylamine, tributylamine, dimethylbenzylamine, dicyclohexylmethylamine, dimethylcyclohexylamine, N,N,N',N'-tetramethyldiaminodiethyl ether, bis(dimethylaminopropyl) urea, N-methyl- and N-ethylmorpholine, N,N'-dimorpholinodiethyl ether (DMDEE), N-cyclohexylmorpholine, N,N,N',N'-tetramethylethylenediamine, N,N,N',N'-tetramethylbutanediamine, N,N,N',N'-tetraethylhexane-1,6-diamine, pentamethyldiethylenetriamine, dimethylpiperazine, N-dimethylaminoethylpiperidine, 1,2-dimethylimidazole, N-hydroxypropyl-imidazole, 1-azabicyclo[2.2.0]octane, 1,4-diazabicyclo[2.2.2]octane (Dabco) and alkanolamine compounds, such as triethanolamine, triisopropanolamine, N-methyl- and N-ethyl-diethanolamine, dimethylaminoethanol, 2-(N,N-dimethylaminoethoxy)ethanol, N,N',N-tris(dialkylaminoalkyl)hexahydrotriazines, e.g. N,N',N-tris(dimethylaminopropyl)-s-hexahydrotriazine, iron(II) chloride, zinc chloride or lead octoate. Preference is given to tin salts, such as tin dioctoate, tin diethylhexoate, dibutyltin dilaurate and/or dibutyldilauryltin mercaptide, 2,3-dimethyl-3,4,5,6-tetrahydropyrimidine, tetraalkylammonium hydroxides, such as tetramethylammonium hydroxide, alkali metal hydroxides, such as sodium hydroxide, alkali metal alkoxides, such as sodium methoxide and potassium isopropoxide and/or alkali metal salts of long-chain fatty acids having 10 to 20 carbon atoms and, where appropriate, lateral OH groups. Preferred catalysts are tertiary amines, particular preference being given to triethylamine, ethyldiisopropylamine and 1,4-diazabicyclo[2.2.2]octane. The catalysts are used in amounts of 0.01% to 8%, preferably of 0.05% to 5%, more preferably of 0.1% to 3% by weight, based on the total solids content. Mixtures of the catalysts can also be added.

To prepare the nanourea dispersion of the invention it is possible where appropriate, in addition to the reaction of the isocyanate groups with water, to use compounds containing isocyanate-reactive groups as well. In this case suitable examples include all known aliphatic, cycloaliphatic, araliphatic and aromatic mono-, di- and polyamines, and also polymers containing amino groups such as aminopolyethers or oligoethylenimines. It is possible to employ monoamines such as methyl-, ethyl-, (iso)propyl- and butylamine or diisopropylamine, diamines and triamines such as ethylenediamine, N,N'-dimethylethylenediamine, 1,3-propylenediamine, 1,6-hexamethylenediamine, isophoronediamine, 4,4'-diaminodicyclohexylmethane, diethylenetriamine, triethylenetetramine, 1,3- and 1,4-phenylenediamine, 4,4'-diphenylmethanediamine, hydrazine, methylenebisaniline or triaminononane. Also suitable are heterocyclic amines such as pyrazole and triazole and their derivatives and amonifunctional polyethylene oxides or propylene oxides. Preference is given to using diamines, more preferably ethylenediamine, 1,3-propylenediamine, 1,6-hexamethylenediamine, isophoronediamine, 4,4'-diaminodicyclohexylmethane or hydrazine. Also possible is partial chain extension by means of other isocyanate-reactive compounds with a functionality of two, three or more, such as alcohols, thiols. Examples are 1,4-butanediol, 1,4-cyclohexanedimethanol, 1,6-hexanediol, trimethylolethane, trimethylolpropane, glycerol or 1,2-ethanethiol. Molecules with different isocyanate-reactive groups can be used as well, such as N-methylethanolamine and N-methylisopropanolamine, 1-aminopropanol, diethanolamine, 1,2-hydroxyethanethiol or 1-aminopropanethiol, for example.

The chosen ratio for the added isocyanate-reactive groups to the isocyanate groups is less than 0.5, preferably less than 0.3, more preferably less than 0.2. The compounds described can be added before the water is added, at the same time, or afterwards. It is also possible to add a solution of compounds containing isocyanate-reactive groups to the water used for dispersing.

Suitable polyisocyanates for preparing the nanourea dispersions of the invention are all aliphatic, cycloaliphatic, araliphatic and aromatic polyisocyanates which are known per se and have an isocyanate content of 0.5% to 50%, preferably 3% to 30%, more preferably 5% to 25% by weight, or mixtures thereof. Examples of suitable polyisocyanates are butylene diisocyanate, tetramethylene diisocyanate, cyclohexane 1,3- and 1,4-diisocyanate, hexamethylene diisocyanate (HDI), 1-isocyanato-3,3,5-trimethyl-5-isocyanatomethylcyclohexane (isophorone diisocyanate, IPDI), 2,4,4-trimethylhexamethylene diisocyanate, isocyanatomethyloctane 1,8-diisocyanate, methylenebis(4-isocyanatocyclohexane), tetramethylxylylene diisocyanate (TMXDI) or triisocyanatononane. Also suitable in principle are aromatic polyisocyanates such as phenylene 1,4-diisocyanate, tolylene 2,4- and/or 2,6-diisocyanate (TDI), diphenylmethane 2,4'- and/or 4,4'-diisocyanate (MDI), triphenylmethane 4,4'-diisocyanate, and naphthylene 1,5-diisocyanate. Of preferential suitability are polyisocyanates which contain heteroatoms in the radical containing the isocyanate groups. Examples of such are polyisocyanates containing carbodiimide groups, allophanate groups, isocyanurate groups, urethane groups and biuret groups. Preference is given to polyisocyanates which are used primarily in the preparation of paints, examples being modification products, containing biuret, isocyanurate or uretdione groups, of the abovementioned simple polyisocyanates, especially of hexamethylene diisocyanate or of isophorone diisocyanate. Particularly preferred polyisocyanates are those based on hexamethylene diisocyanate.

Additionally suitable are polyisocyanates containing urethane groups, as are formed by reaction of IPDI or TDI, used in excess, with polyol compounds, preference being given to low molecular weight polyols in the molecular weight range from 62 to 300 with an OH functionality of greater than 2. Suitable low molecular weight polyols are short-chain diols or triols—that is diols or triols containing 2 to 20 carbon atoms—which are aliphatic, araliphatic or cycloaliphatic. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Preference is given to 1,4-butanediol, 1,4-cyclohexanedimethanol and 1,6-hexanediol. Examples of suitable triols are trimethylolethane, trimethylolpropane or glycerol; preference is given to trimethylolpropane and glycerol.

Suitable polyisocyanates are, furthermore, the known prepolymers containing terminal isocyanate groups, of the kind obtainable in particular by reacting the abovementioned simple polyisocyanates, preferably diisocyanates, with substoichiometric amounts of organic compounds, having at least two isocyanate-reactive functional groups. In these prepolymers the ratio of isocyanate groups to isocyanate-reactive hydrogen atoms corresponds to 1.05:1 to 10:1, preferably 1.1:1 to 3:1, the hydrogen atoms coming preferably from hydroxyl groups. Examples of suitable organic compounds are hydroxyl-containing polyurethanes, polyester polyols, polyether polyols, polycarbonate diols or polyacrylate or polymethacrylate polyols or mixtures thereof.

Hydrophilicizing agents are compounds containing nonionic hydrophilic groups.

Examples of suitable nonionically hydrophilicizing compounds are polyoxyalkylene ethers which contain at least one hydroxyl or amino group. These polyethers contain a fraction of 30% to 100% by weight of units derived from ethylene oxide. Those suitable are polyethers of linear construction with a functionality of between 1 and 3, but also compounds of the general formula (I)

(I)

in which

R$^1$ and R$^2$ independently of one another are each a divalent aliphatic, cycloaliphatic or aromatic radical having 1 to 18 C atoms which can be interrupted by oxygen and/or nitrogen atoms and R$^3$ is an alkoxy-terminated polyethylene oxide radical.

Nonionically hydrophilicizing compounds are, for example, also monofunctional polyalkylene oxide polyether alcohols having on average 5 to 70, preferably 7 to 55, ethylene oxide units per molecule, of the kind obtainable in conventional manner by alkoxylation of suitable starter molecules (e.g. in Ullmanns Encyclopädie der technischen Chemie, 4th edition, Volume 19, Verlag Chemie, Weinheim pp. 31-38).

Examples of suitable starter molecules are saturated monoalcohols such as methanol, ethanol, n-propanol, isopropanol, n-butanol, isobutanol, sec-butanol, the isomeric pentanols, hexanols, octanols and nonanols, n-decanol, n-dodecand, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and also heterocyclic secondary amines such as morpholine, pyrrolidine, piperidine or 1H-pyrazole. Preferred starter molecules are saturated monoalcohols. Particular preference is given to using methanol, butanol and diethylene glycol monobutyl ether as starter molecules.

Alkylene oxides suitable for the alkoxylation reaction are, in particular, ethylene oxide and propylene oxide, which can be used in any order or else as a mixture in the alkoxylation reaction.

The polyalkylene oxide polyether alcohols are either pure polyethylene oxide polyethers or mixed polyalkylene oxide polyethers at least 30 mol %, preferably at least 40 mol %, of whose alkylene oxide units are composed of ethylene oxide units. Preferred nonionic compounds are monofunctional mixed polyalkylene oxide polyethers which contain at least 40 mol % ethylene oxide units and not more than 60 mol % propylene oxide units.

Mixtures of different hydrophilicizing agents can also be used. The hydrophilicizing agents can be incorporated into the polyisocyanates for use in accordance with the invention by a method known per se.

The nanourea dispersions of the invention have a solids content of 31% to 65%, preferably of 35% to 55%, more preferably of 40% to 50% by weight.

A distinguishing feature of the nanourea dispersions of the invention is that they contain only a certain number of basic groups on the surface. As a consequence of this the dispersions of the invention are miscible with dispersions of anionically hydrophilicized polymers and hence are suitable for use in combination with such dispersions.

In the course of the preparation of the nanourea dispersions it is also possible to use cosolvents, defoamers, surface-active detergents and other auxiliaries and additives. Other additives too, from areas such as paint, sealant or adhesive formulation, such as pigments or fillers, for example, can be added.

The nanourea dispersions of the invention can be used for example as additive, binder or auxiliary or adjuvant for the producing coating compositions such as paints, inks, adhesives and sealants.

The present invention also provides for the use of the nanourea dispersions of the invention for producing paints, inks, adhesives and sealants.

Likewise provided by the present invention are coating compositions comprising the nanourea dispersions of the invention.

The production of the paints, inks, adhesives and other formulations with the nanourea dispersions of the invention takes place by methods which are known per se. Besides the nanourea dispersions, the formulations may be admixed with typical additives and other auxiliaries such as pigments, binders, fillers, flow control agents, defoamers, dispersing assistants and catalysts in amounts the skilled person can easily determine.

For the purpose of preservation it is also possible to add biocides to the dispersion of the invention. They are used preferably in amounts of 0.02 to 1% by weight, based on non-volatile fractions. Examples of suitable fungicides are phenol derivatives and cresol derivatives or organotin compounds.

EXAMPLES

Coagulation Tests The anionically hydrophilicized dispersions Impranil® DLN (anionic aliphatic polyester polyurethane dispersion in water with a solids content of approximately 40%, Bayer MaterialScience AG, Deutschland) and Dispercoll® U 54 (anionic aliphatic polyester polyurethane dispersion in water with a solids content of approximately 50%, Bayer MaterialScience AG, Leverkusen, DE) were each introduced in the as-supplied form, in an amount of 20 ml, into a vessel, and 3 ml of the nanourea dispersion were added in each case. Following addition or a few minutes of stirring with a glass rod it became apparent whether coagulation took place.

Chemicals

Bayhydur® VP LS 2336: hydrophilicized polyisocyanate based on hexamethylene diisocyanate, solvent-free, viscosity approximately 6800 mPa s, isocyanate content approximately 16.2%, Bayer MaterialScience AG, Leverkusen, DE.

Isofoam® 16: defoamer, Petrofer-Chemie, Hildesheim, DE.

Charge Determination

A portion of the sample is weighed out to an accuracy of 0.0001 g (mass typically between 0.2 g and 1 g, depending on amount of charge), admixed with a 5% strength by weight aqueous surfactant solution (Brij®-96 V, Fluka, Buchs, Switzerland product No. 16011) and doubly deionized water, and, following addition of a defined amount of hydrochloric acid (0.1 N, so that the batch has an initial pH of approximately 3; KMF Laborchemie GmbH, Lohmar, Art. No.: KMF.01-044.1000), was titrated with aqueous sodium hydroxide standard solution (0.05 N; Bernd Kraft GmbH, Duisburg, Art. No.: 01056.3000). In addition, in order to differentiate between the surface charge and the liquid-phase charge, a portion (approximately 30 g) of the dispersion is treated with Lewatit® VP-OC 1293 ion exchanger (employing the 10-fold exchange capacity relative to the defined total charge, stirring time 2.0 h, Lanxess AG, Leverkusen, Deutschland, mixed anion/cation exchanger) and the resulting dispersion, after filtration (E-D-Schnellsieb fast sieve, cotton fabric 240 μm, Erich Drehkopf GmbH, Ammersbek, Deutschland), was titrated. With the titration of the sample after ion exchanger treatment the surface charge is determined. By calculating the difference from the total charge it is possible to determine the liquid-phase charge.

The determination of the surface charge from the points of equivalence provides, within the bounds of measurement accuracy, a comparable value to the determination of basic groups from the minimum consumption of sodium hydroxide solution, relative to the amount of hydrochloric acid added.

It follows from this that the charge quantities determined relate to basic groups and not to weakly acidic groups (e.g. carboxyl groups).

The identification μeq/g stands for microequivalents per gram of solids; one equivalent is one mol of ionic groups.

Zeta Potential Determination

A small amount of the sample is highly diluted with 1 millimolar potassium chloride solution and homogenized by stirring. Dilute hydrochloric acid or sodium hydroxide solution is used to set the pH of 8.0. Subsequently the zeta potential is determined at 23° C. in the ZetaSizer 3000HSA" (Malvern Instruments, Herrenberg, Germany).

Storage Test

A sample is stored in a 1-litre polyethylene bottle. Visual inspection determines whether the bottle expands, which represents a sign of gas evolution. Unless noted otherwise, all percentages are by weight.

Unless noted otherwise, all analytical measurements are based on temperatures of 23° C.

The viscosities reported were determined by means of rotational viscometry in accordance with DIN 53019 at 23° C. using a rotary viscometer from Anton Paar Germany GmbH, Ostfildern, DE.

Unless explicitly mentioned otherwise, NCO contents were determined volumetrically in accordance with DIN EN ISO 11909.

The particle sizes reported were determined by means of laser correlation spectroscopy (instrument: Malvern Zetasizer 1000, Malvern Inst. Limited).

The solids contents were determined by heating a weighed sample at 120° C. At constant weight, the solids content was calculated after reweighing of the sample.

Monitoring for free NCO groups was carried out by means of IR spectroscopy (band at 2260 cm$^{-1}$).

Measurement of the Storage Moduli of the Respective Adhesive Films:

The solids concentrations of the samples were approximately 30% or 40%. The samples were first of all mixed thoroughly using a glass rod.

The investigations were carried out using an ultrasound reflection method referred to as a film rheometer. A description of the method is found for example in Alig, I.; Lellinger, D., Chemical Innovation 30 (2), 13 (2000). With the method employed the reflection coefficient of an ultrasound wave is determined with a measurement frequency of 5 MHz at the interface between measuring cell and sample. Through the free surface area of the film it is possible to determine the shear modulus of the sample during film formation and crystallization.

For the purpose of investigation, the samples were knife-coated as a film with a wet film thickness of 300 μm to the quartz crystals of the ultrasound film rheometer.

Drying and film formation were carried out at a temperature of 55° C. and a relative atmospheric humidity of 50%. The dry film thickness was approximately 80 to 100 μm, therefore corresponding to the minimum film thickness. In order to monitor whether the measurement was not being influenced by an inadequate film thickness, a strip of adhesive tape is affixed subsequently to the dried film and an ultrasound monitoring measurement is carried out. If the modulus figure has not changed, the film thickness was sufficient. For all of the measurements carried out, the minimum film thickness was achieved, and therefore the respective results are independent of the film thickness.

EXAMPLES

1) Comparative Example 1, Analogous to Nanourea 1 from WO-A 2005/063873

319.8 g of Bayhydur® VP LS 2336 are added at room temperature to 746.20 g of deionized water with stirring, and stirring is continued for 10 minutes. Thereafter 0.05 g of triethylenediamine (diazabicyclononane) is added and the mixture is stirred vigorously at room temperature. After 9 hours, foaming occurred, the foam occupying more than three times the volume of the reaction batch and foaming out of the reaction vessel.

The remaining dispersion was stirred for a further 10 hours, after which it no longer contained any isocyanate groups (IR spectrum). A white dispersion formed which had the following properties:

| | |
|---|---|
| Solids content: | 29% |
| Particle size (LCS): | 89 nm |
| Viscosity (viscometer, 23° C.): | <50 mPas |

Charge determination: total charge 318±32 μeq/g, surface charge 203±5 μeq/g

Zeta potential (pH=8): 44.3±0.6

Coagulation tests: coagulation takes place

Storage test: expansion of the bottle apparent after about 2 weeks

In the process, problems arose in relation to the reaction kinetics, the reaction starting only after 9 hours, but then becoming highly exothermic within a few minutes and being uncontrollable as a result of the accompanying foam formation.

2) Comparative Example 2

1640 g of Bayhydur® VP LS 2336 are added at room temperature to 3851.2 g of deionized water, with stirring, 0.32 g of Isofoam® 16 is added, and the mixture is stirred for 10 minutes. Thereafter 10.36 g of triethylamine are added and the mixture is stirred vigorously at room temperature. After 3 hours there was severe foam overflow from the reaction vessel, meaning that the batch had to be discontinued by addition of a large amount of cold water.

It was found that an increase in the amount of base was suitable for accelerating the reaction; the addition of the defoamer did not adequately suppress foam formation.

3) Comparative Example 3

The procedure described for Comparative Example 2 was repeated, but the defoamer was added only after 3 hours, since the start of reaction was perceptible by initial development of foam. As a result the foam occupied less than 4 liters of additional volume in the reaction vessel, and it was possible as a result to prevent foam overflow of the batch.

The white dispersion obtained had the following properties:

| | |
|---|---|
| Solids content: | 29% |
| Particle size (LCS): | 116 nm |
| Viscosity (viscometer, 23° C.): | <50 mPas |
| pH (23° C.): | 6.03 |

Charge determination: Total charge 150±11 μeq/g, surface charge 98±5 μeq/g

Zeta potential (pH=8): 42.8±0.3

Coagulation tests: Coagulation takes place

Storage test: Expansion of the bottle perceptible after about 2 weeks

It was found that it is advantageous to add the defoamer only in the course of the reaction. In addition it was found that the dispersion obtained is not compatible with anionically hydrophilicized dispersions.

4) Comparative Example 4

The procedure described for Comparative Example 3 was repeated, but with addition of 2186.6 g of Bayhydur® VP LS 2336. After about 3 hours the start of reaction resulted in severe foam overflow of the reaction mixture and in a thickening of the reaction batch. Foaming took place very quickly and was not controllable by further dropwise addition of Isofoam® 16. As a result of this the batch was discontinued by severe dilution with cold water and with cooling in an icebath.

It was apparent that, using the method described, in spite of the use of a defoamer, it is not possible to prepare a dispersion having a 40% solids content.

5) Comparative Example 5

The procedure described for Comparative Example 3 was repeated, but with addition of 1913 g of Bayhydur® VP LS 2336. After about 3 hours the start of reaction resulted in severe foam overflow of the reaction mixture. Foaming took place very quickly and was not controllable by further dropwise addition of Isofoam® 16. As a result of this the batch was discontinued by severe dilution with cold water.

It was apparent that, using the method described, in spite of the use of a defoamer, it is not possible to prepare a dispersion having a 35% solids content.

6) Nanourea, Inventive, Portionwise Addition of Hydrophilicized Isocyanate to Water, 30% Solids A solution of 8.25 g of triethylamine and 0.09 g of Isofoam® 16 in 976.2 g of deionized water was admixed at room temperature and with vigorous stirring with 136.67 g of Bayhydur® VP LS 2336 and stirring was continued. An attached gas meter was used to monitor the evolution of carbon dioxide; the next portion of Bayhydur® VP LS 2336 was added only after a major fraction of the isocyanate groups had undergone reaction. After 3 hours and after 6 hours, a further 136.67 g of Bayhydur® VP LS 2336 were added in each case and, after the final addition, stirring was continued for 5 hours more. The foam which developed during the reaction occupied a volume of not more than 200 ml.

The white dispersion obtained had the following properties:

| | |
|---|---|
| Solids content: | 30% |
| Particle size (LCS): | 94 nm |
| Viscosity (viscometer, 23° C.): | <50 mPas |
| pH (23° C.): | 7.33 |

Coagulation tests: no coagulation apparent

Charge determination: Total charge 124±6 µeq/g, surface charge 4±1 µeq/g

Zeta potential (pH=8): 11.3±1.6

Storage test: Expansion of the bottle perceptible after about 2 weeks; over the course of 12 weeks, no formation of a precipitate was observed.

It became apparent that it is also possible to add hydrophilicized isocyanate in portions to water. Although nanourea particles have already formed, it is possible to form further particles in this dispersion as soon as a new portion of hydrophilicized isocyanate is added. Surprisingly the newly added particles do not aggregate with existing particles which would lead to very large particles and hence to unstable dispersions. The fact that this is not the case is evidenced by the LCS particle size measurement of <400 nm and by the fact that even within 12-week room temperature storage there was no observable formation of sediment.

7) Nanourea, Inventive, Portionwise Addition of Hydrophilicized Isocyanate to Water, 40% Solids A solution of 20.72 g of triethylamine in 4952 g of deionized water was admixed at 30° C. with vigorous stirring with 820.20 g of Bayhydur® VP LS 2336 and subsequently 0.32 g of Isofoam® 16 and stirring was continued. After 3, 6 and 9 hours a further 820.20 g of Bayhydur® VP LS 2336 in each case and subsequently 0.32 g of Isofoam® 16 in each case were added, followed by stirring at 30° C. for a further 4 hours. Thereafter the mixture was stirred under a vacuum of 200 mbar at 30° C. for a further 3 hours and the dispersion formed was dispensed.

The white dispersion obtained had the following properties:

| | |
|---|---|
| Solids content: | 40% |
| Particle size (LCS): | 83 nm |
| Viscosity (viscometer, 23° C.): | <50 mPas |
| pH (23° C.): | 8.33 |

Charge determination: Total charge 57±6 µeq/g, surface charge 15±1 µeq/g

Zeta potential (pH=8): 24.9±1.0

Coagulation tests: no coagulation apparent

Storage test: No expansion of the bottle apparent within 12 weeks, nor was any formation of a precipitate observed over the course of 12 weeks.

It was apparent that, in accordance with the procedure of the invention, it is also possible to obtain dispersions which have a solids content of more than 30%. A corresponding experiment in accordance with prior-art methods was unsuccessful (Comparative Example 3 and 4). Stability on storage and compatibility with anionically hydrophilicized dispersions are satisfied.

8) Nanourea, Inventive, Portionwise Dispersing of Hydrophilicized Isocyanate in Water in a Mixing Vessel and Transferring to the Reaction Vessel, 40% Solids A solution of 10.0 g of triethylamine and 0.27 g of Isofoam® 16 are introduced into a vessel in 200 g of deionized water at 30° C. and with stirring.

In a second vessel at room temperature 700 g of Bayhydur® VP LS 2336 are added to 1050 g of deionized water and dispersed by 15 minutes of stirring. The dispersion is subsequently transferred to the first flask.

After 3, 6 and 9 hours a further 700 g of Bayhydur® VP LS 2336 were added each time to 1050 g of deionized water, dispersed by 15 minutes of stirring and transferred to the first vessel. Subsequently the mixture was stirred at 30° C. for 4 hours more. Thereafter it was stirred under a vacuum of 200 mbar at 30° C. for a further 3 hours and the dispersion formed was dispensed.

The white dispersion obtained had the following properties:

| | |
|---|---|
| Solids content: | 40% |
| Particle size (LCS): | 117 nm |
| Viscosity (viscometer, 23° C.): | <50 mPas |
| pH (23° C.): | 6.98 |

Charge determination: Total charge 32±2 µeq/g, surface charge 7±2 µeq/g

Zeta potential (pH=8): 3.2±0.4

Coagulation tests: no coagulation apparent

Storage test: No expansion of the bottle apparent within 12 weeks, nor was any formation of a precipitate observed over the course of 12 weeks.

It was apparent that a high-solids nanourea dispersion can also be produced by dispersing of the hydrophilicized isocyanate in portions in water with subsequent transfer to a reaction vessel.

9) Production of an Adhesive Based on the Nanourea Dispersions

The formulation is prepared by charging the polychloroprene dispersion to a glass beaker. With cautious stirring the ageing inhibitor, ZnO and the nanourea are added.

10) Results of the Rheological Investigations

The relevant result employed was the storage modulus of the respective adhesive films after a measurement period of 30 minutes (at 55° C.).

| Sample designation | Storage modulus G' [MPa] |
|---|---|
| Adhesive without nanourea | 14.8 |
| Adhesive without nanourea as per Comparative Example 3 | 22.6 |
| Adhesive without nanourea as per Inventive Example 7 | 26.9 |
| Adhesive without nanourea as per Inventive Example 8 | 30.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Nanourea dispersions comprising nanourea particles having a particle size of 10 to 300 nm and a zeta potential, of 0 to 40 mV and wherein the dispersions have a solids content of 40 to 65% by weight.

2. Nanourea dispersions according to claim 1 wherein the nanourea particles have cationic or basic groups on the particle surface in an amount of 0 to 95 µmol per gram of solids.

3. Nanourea dispersions according to claim 1 wherein the dispersions have a solids content of 40% to 50% by weight.

4. Process for preparing the nanourea dispersions according to claim 1, comprising mixing polyisocyanates possessing non-ionic groups for hydrophilization with water and breaking the polyisocyanates down to urea groups, the ratio of hydrophilicized polyisocyanate to water being chosen so as to result in a total weight ratio of between 1:20 and 1:0.75.

5. Process according to claim 4, wherein the hydrophilized polyisocyanate is added to the water in portions, the total amount of the hydrophilicized polyisocyanate is divided into 2 to 50 equally- or differently-sized portions, and the addition of each polyisocyanate portion being followed by a pause of between 5 minutes and 12 hours before the next portion is added.

TABLE 1

Preparation of the formulation for the comparative investigations

| Product | Function | Added as | Solids content (%) | Amount used in g, based on solids |
|---|---|---|---|---|
| Dispercoll ® C 84 (1) | polymer | dispersion | 55 | 100 |
| Rhenofit ® DDA-EM 50 (2) | ageing inhibitor | dispersion | 50 | 1.8 |
| Borchers ® 8902 (3) | ZnO | dispersion | 25 | 3.6 |
| Nanourea | additive | dispersion | 30-40 | 15 |

Sources:
(1): Bayer MaterialScience AG, Leverkusen, D (aqueous polychloroprene dispersion)
(2): Rhein Chemie GmbH, Mannheim, D (50% diphenylamine derivative in aqueous emulsion)
(3): Borchers GmbH, Langenfeld, D (zinc oxide paste)

6. Process according to claim 4, wherein, subsequent to the reaction, the dispersion is evacuated, the temperatures for the evacuation being between 0° C. and 80° C. and the pressure being between 1 and 900 mbar.

7. Process according to claim 4, further comprising adding compounds containing isocyanate-reactive groups to the reaction, the ratio of the isocyanate-reactive groups to the isocyanate groups being less than 0.5.

8. Process according to claim 4, wherein the reaction takes place in a single vessel.

9. Process according to claim 4, wherein one or more catalysts are used in amounts of 0.01% to 8% by weight, based on the total solids content.

10. Process according to claim 9, wherein the catalyst is a tertiary amine.

11. Process according to claim 10, wherein the nonionically hydrophilicizing compounds are monofunctional mixed polyalkylene oxide polyethers which contain at least 40 mol % ethylene oxide units and not more than 60 mol % propylene oxide units.

12. Process according to claim 4, wherein the polyisocyanates are modification products of hexamethylene diisocyanate or isophorone dissocyanate containing groups selected from the group consisting of biuret, isocyanurate and uretdione groups.

13. Process according to claim 4, wherein the nonionically hydrophilicizing compounds are monoflinctional polyalkylene oxide polyether alcohols having on average 5 to 70 ethylene oxide units per molecule.

14. Coating compositions comprising nanourea dispersions according to claim 1.

15. Compositions comprisin g nanourea dispersions according to claim 1, said compositions selected from the group consisting of additives, binders, auxiliaries and adjuvants for producing coating compositions, adhesives and sealants.

16. Nanourea dispersions according to claim 1, wherein the nanourca particles have cationic or basic groups on the particle surface in an amount of 2 to 70 μmol per gram of solids.

17. Nanourea dispersions according to claim 1, wherein the nanourea particles have cationic or basic groups on the particle surface in an amount of 3 to 20 μmol per gram of solids.

18. Nanourea dispersions according to claim 17, wherein the dispersions have a solids content of 40% to 50% by weight.

* * * * *